(12) United States Patent
Nakagawa (10) Patent No.: US 8,331,447 B2
(45) Date of Patent: Dec. 11, 2012

(54) APPARATUS FOR DECODING VIDEO COMPRESSION CODED DATA

(75) Inventor: Satoshi Nakagawa, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 587 days.

(21) Appl. No.: 12/591,576

(22) Filed: Nov. 24, 2009

(65) Prior Publication Data

US 2010/0254454 A1 Oct. 7, 2010

(30) Foreign Application Priority Data

Apr. 3, 2009 (JP) ................. 2009-090938

(51) Int. Cl.
- *H04N 7/12* (2006.01)
- *H04N 11/02* (2006.01)
- *H04N 11/04* (2006.01)

(52) U.S. Cl. ......... 375/240.12; 375/240.03; 375/240.22; 704/222; 704/230; 382/238; 382/251; 382/253; 348/394.1; 348/409.1; 348/411.1; 348/412.1; 348/415.1

(58) Field of Classification Search ............ 375/240.01–240.29; 348/384.1–440.1; 704/222, 230; 382/251, 253

See application file for complete search history.

(56) References Cited

U.S. PATENT DOCUMENTS

| | | | | |
|---|---|---|---|---|
| 5,481,543 A | * | 1/1996 | Veltman | 370/473 |
| 5,576,772 A | * | 11/1996 | Kondo | 348/699 |
| 5,838,378 A | * | 11/1998 | Nakagawa et al. | 375/240.12 |
| 6,782,132 B1 | * | 8/2004 | Fogg | 382/232 |

FOREIGN PATENT DOCUMENTS

JP 2006-157938 A 6/2006

* cited by examiner

*Primary Examiner* — Sath V Perungavoor
*Assistant Examiner* — Nathnael Aynalem
(74) *Attorney, Agent, or Firm* — Rabin & Berdo, P.C.

(57) ABSTRACT

A decoding apparatus includes a standard predicted image generating unit which generates a standard decoded image and a standard predicted image of standard image quality; a non-standard decoded image generating unit which generates a non-standard decoded image different in image quality based on a prediction error information; a non-standard predicted image generating unit which generates a non-standard predicted image different in image quality based on the non-standard decoded image; and a correction value calculating unit which calculates correction values corresponding to differences between the standard and non-standard predicted images. The non-standard decoded image generating unit includes a predicted image reconstructing unit which corrects the non-standard predicted image, and a decoding unit which inverse-quantizes the prediction error information and adds the inverse-quantized prediction error information and the corrected non-standard predicted image to generate the non-standard decoded image.

16 Claims, 7 Drawing Sheets

APPARATUS FOR DECODING VIDEO COMPRESSION CODED DATA

BACKGROUND OF THE INVENTION

1. Technical Field

The present invention relates to a technology for decoding a compression coded video signal.

2. Description of the Related Art

As standards for the compression coding scheme for moving image data, there exist H.262/MPEG-2 (hereinafter called MPEG-2), H.264/MPEG4-AVC (hereinafter called H.264), and the like. MPEG-2 was standardized by ISO/IEC to encode television signals in an interlaced format at around 6 Mbit/s and encode HDTV signals at about 20 Mbit/s. The video part of MPEG-2 (ISO/IEC 13818-2) has been published as common text (ITU-T H.262) with ITU-T. In contrast, H.264 is assumed to be widely used from low bit rate applications such as mobile phones to high bit rate applications such as HDTV and was standardized by a joint group JVT of ITU-T and ISO/IEC.

Video compression coding technology of these standards comprises a motion-compensated inter-image difference coding technique, an orthogonal transform technique such as a discrete cosine transform (DCT), a quantization/inverse quantization technique, an entropy coding technique such as variable-length coding, and so on.

In video compression coding based on these standards, in order to achieve high efficiency coding, quantization is performed where a video signal is divided by a certain value and where the remainder is rounded. When decoding video compression coded data, data rounded by quantization is not completely restored, and thus degradation in image quality such as block distortion or mosquito distortion will appear if the divisor is large.

As techniques to reduce the quantization noise influence in a decoding apparatus, there have been a post-filtering process, a loop filtering process, and the like. As to the loop filtering process, for example, deblocking filtering is specified as standard in H.264. As to the post-filtering process, there is a technique shown in, e.g., Japanese Patent Application Laid-Open Publication No. 2006-157938 (Reference 1).

SUMMARY OF THE INVENTION

However, in a conventional decoding apparatus compliant with the standard, with sequentially referencing decoded images, predicted images are generated, and using the predicted images, decoded images are constructed. Hence, the degradation will occur that the deviation is sequentially propagated through the subsequent decoded images when a decoded image referenced deviates from its original decoded image. In the conventional post-filtering process, only images finally output from a decoding apparatus are subject to the filtering. That is, reference images used in generating predicted images are referenced with quantization noise remaining therein without the filtering being performed thereon, and predicted images are generated based on these reference images. Hence, there is a problem that image quality is not sufficiently improved by the post-filtering process.

Further, although the application of the loop filtering is specified as a standard decoding procedure, drift noise may occur if performing a filtering process different from the standard one to improve degradation in image quality when constructing decoded images. Hence, there is the problem that no process other than the standard one can be applied.

The present invention was made in view of the above facts, and an object thereof is to provide an apparatus for decoding video compression coded data which can improve degradation in image quality due to a quantization error or the like and reduce degradation in image quality that is caused by performing a decoding process different from the standard one.

According to the present invention, there is provided an apparatus for decoding video compression coded data into which prediction error information indicating differences between a predicted image generated from a decoded image and an image being coded was quantized and coded. The decoding apparatus comprises a standard predicted image generating unit which generates a standard decoded image of standard image quality based on the prediction error information and generates a standard predicted image of standard image quality based on the standard decoded image; a non-standard decoded image generating unit which generates a non-standard decoded image different in image quality from the standard decoded image based on the prediction error information; a non-standard predicted image generating unit which generates a non-standard predicted image different in image quality from the standard predicted image based on the non-standard decoded image; and a correction value calculating unit which calculates correction values corresponding to differences between the standard predicted image and the non-standard predicted image. The non-standard decoded image generating unit comprises a predicted image reconstructing unit which corrects the non-standard predicted image based on the correction values, and a non-standard decoding unit which inverse-quantizes the prediction error information for reproduction and which adds the inverse-quantized prediction error information and the corrected non-standard predicted image to generate the non-standard decoded image.

Another decoding apparatus of the present invention is an apparatus for decoding video compression coded data into which prediction error information indicating differences between a predicted image generated from a decoded image and an image being coded was orthogonal-transformed and quantized, and coded. The decoding apparatus comprises a standard predicted image generating unit which generates a standard decoded image of standard image quality based on the prediction error information and generates a standard predicted image of standard image quality based on the standard decoded image; a non-standard decoded image generating unit which generates a non-standard decoded image different in image quality from the standard decoded image based on the prediction error information; a non-standard predicted image generating unit which generates a non-standard predicted image different in image quality from the standard predicted image based on the non-standard decoded image; a first orthogonal transforming unit which orthogonal-transforms pixel values of the standard predicted image to generate orthogonal transform coefficients of the standard predicted image; a second orthogonal transforming unit which orthogonal-transforms pixel values of the non-standard predicted image to generate orthogonal transform coefficients of the non-standard predicted image; and a correction value calculating unit which calculates correction values corresponding to differences between the orthogonal transform coefficients of the standard predicted image and the orthogonal transform coefficients of the non-standard predicted image. The non-standard decoded image generating unit comprises an orthogonal transform coefficient correcting unit which corrects the orthogonal transform coefficients of the non-standard predicted image based on the correction values, and a non-standard decoding unit which inverse-quantizes the prediction error information for reproduction and which adds the inverse-quantized prediction error information and the corrected orthogonal transform coefficients of the non-standard predicted image and then performs inverse orthogonal transform thereon to generate the non-standard decoded image.

Yet another decoding apparatus of the present invention is an apparatus for decoding video compression coded data into which prediction error information indicating differences between a predicted image generated from a decoded image and an image being coded was orthogonal-transformed and quantized, and coded. The decoding apparatus comprises a standard predicted image generating unit which generates a standard decoded image of standard image quality based on the prediction error information and generates a standard predicted image of standard image quality based on the standard decoded image; a non-standard decoded image generating unit which generates a non-standard decoded image different in image quality from the standard decoded image based on the prediction error information; a non-standard predicted image generating unit which generates a non-standard predicted image different in image quality from the standard predicted image based on the non-standard decoded image; a difference orthogonal transforming unit which orthogonal-transforms differences in pixel values between the standard predicted image and the non-standard predicted image into difference orthogonal transform coefficients; and a correction value calculating unit which calculates correction values corresponding to the difference orthogonal transform coefficients. The non-standard decoded image generating unit comprises a prediction error correcting unit which inverse-quantizes the prediction error information for reproduction and which adds the inverse-quantized prediction error information and the correction values and then performs inverse orthogonal transform thereon to generate corrected prediction errors, which are prediction errors from the non-standard predicted image, and a non-standard decoding unit which adds the corrected prediction errors and the non-standard predicted image to generate the non-standard decoded image.

According to the apparatus for decoding video compression coded data of the present invention, the non-standard decoded image generating unit performs a noise reduction process according to a procedure different from the standard one, thereby improving the image quality of decoded images, and by using these as reference images used in generating predicted images, the image quality can be further improved. In addition, when generating a decoded image using a non-standard predicted image of image quality different from standard quality generated from this non-standard decoded image, depending on the case, degradation in image quality might be caused on the contrary, but remarkable degradation in image quality can be prevented because corrections are made such that the deviations from the standard predicted image are within the range of quantization errors.

DETAILED DESCRIPTION OF THE INVENTION

Embodiments of the present invention will be described below with reference to the drawings. The same reference numerals are used to denote substantially the same or equivalent constituents or parts throughout the figures cited below.

Embodiment 1

Figure 1:
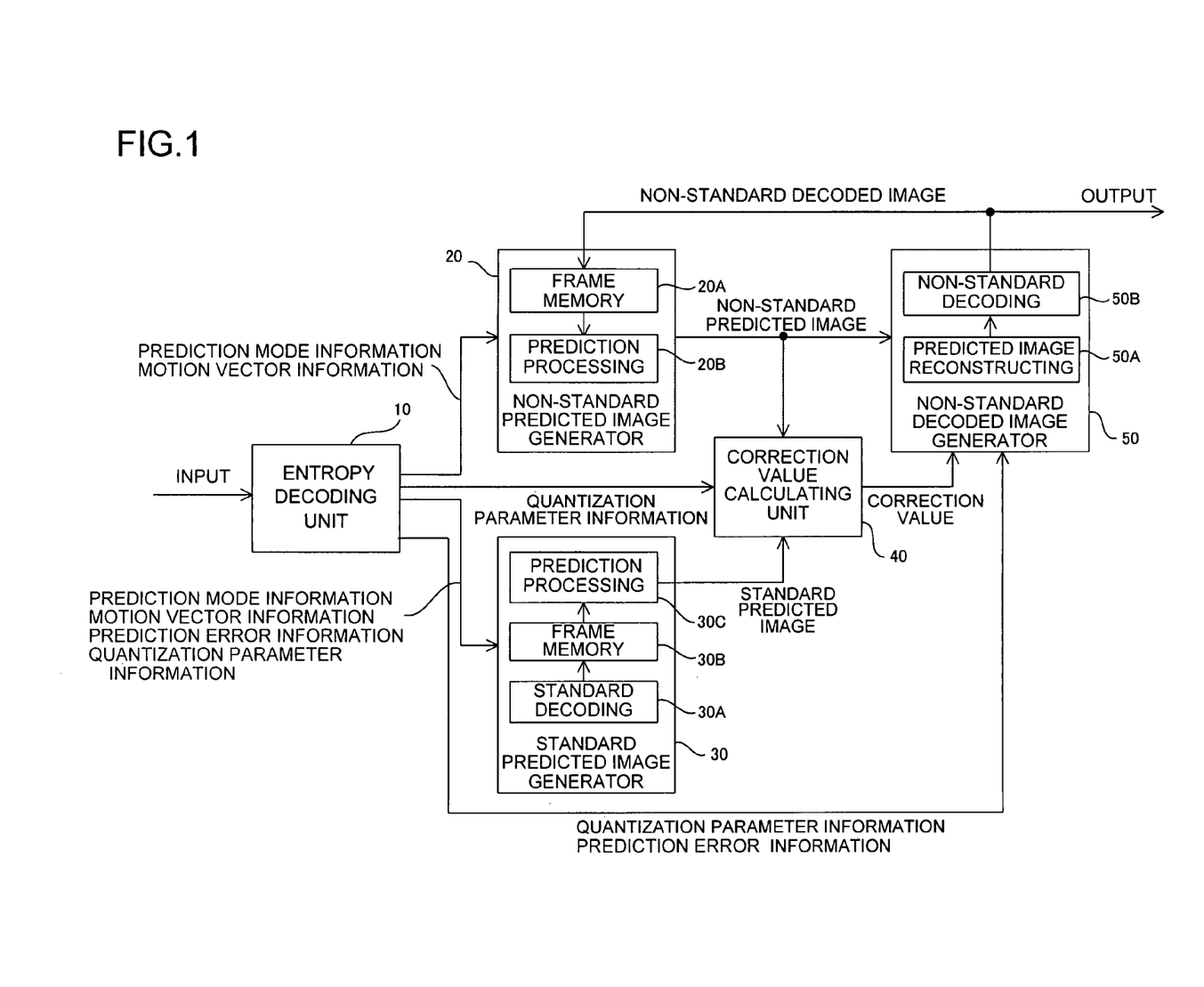
FIG. 1 is a block diagram showing the configuration of an apparatus for decoding video compression coded data according to a first embodiment of the present invention.

FIG. 1 is a block diagram showing the configuration of an apparatus for decoding video compression coded data according to a first embodiment of the present invention. An entropy decoding unit 10 receives video compression coded data subjected to entropy coding such as variable length coding or arithmetic coding by an encoder (not shown) and performs entropy decoding on data such as coding mode information, prediction mode information, motion vector information, prediction error information, and quantization parameter information that have been multiplex transmitted to separate and extract them. Here, the coding mode information is coding mode-related information indicating whether the coding was performed in an intra mode or in an inter mode, and so on. The prediction mode information is information about the predicted image generation process in the encoder and includes, e.g., macro-block partition information, information about the way to refer to the reference image for each partitioned area, and the like. The motion vector information is information indicating the motion vectors used in motion-compensated inter-frame prediction when in the inter mode. The prediction error information is information indicating the differences between an input image to be transmitted and the predicted image. The quantization parameter information is information indicating what quantization process was performed in the encoder and to control quantization step size and the like.

A non-standard predicted image generating unit (or generator) 20 references a non-standard decoded image, as a reference image, decoded according to a procedure different from a standard one and supplied by a non-standard decoded image generating unit 50 described) later, and generates a non-standard predicted image of image quality different from standard quality based on the prediction mode information and the motion vector information. The non-standard predicted image generating unit 20 comprises, for example, a frame memory 20*a* to temporarily store the non-standard decoded image supplied by the non-standard decoded image generating unit 50 and a prediction processing unit 20*b* to refer to a non-standard decoded image stored in the frame memory 20*a* and generate a non-standard predicted image based on the prediction mode information and the motion vector information supplied from the entropy decoding unit 10. The procedure of generating a predicted image in the non-standard predicted image generating unit 20 may be the same as the procedure of generating a predicted image in a standard predicted image generating unit 30, or the non-standard predicted image generating unit 20 may comprise a constituent different from a standard one, e.g., in that it changes filter coefficients of an interpolation filter used in inter-pixel interpolation for a reference image as needed, or so on.

The standard predicted image generating unit 30 comprises a standard decoding unit 30a which performs decoding specified in the standard such as H.264 or MPEG-2 based on the prediction error information and the quantization parameter information supplied from the entropy decoding unit to generate a standard decoded image; a frame memory 30b to temporarily store the generated standard decoded image; and a prediction processing unit 30c to generate a standard predicted image from the prediction mode information and the motion vector information supplied from the entropy decoding unit 10 and the standard decoded image stored in the frame memory 30b. That is, the standard predicted image generated by the standard predicted image generating unit 30 is equivalent in image quality to a predicted image generated by a conventional encoder compliant with the standard.

A correction value calculating unit 40 identifies the difference (i.e., deviation) for each pixel between the non-standard predicted image supplied from the non-standard predicted image generating unit 20 and the standard predicted image supplied from the standard predicted image generating unit 30, and calculates correction values to correct the pixel values of the non-standard decoded image such that the corrected difference is within the range of quantization errors occurring in video compression coded data.

The non-standard decoded image generating unit 50 constructs a non-standard decoded image based on the prediction error information and the quantization parameter information supplied from the entropy decoding unit 10, the non-standard predicted image supplied from the non-standard predicted image generating unit 20, and on the correction values supplied from the correction value calculating unit 40. The non-standard decoded image generating unit 50 comprises a predicted image reconstructing unit 50a which performs correction on the non-standard predicted image based on the correction values to reconstruct a predicted image and a non-standard decoding unit 50b which inverse-quantizes the prediction error information quantized by the encoder based on the quantization parameter information and which adds the inverse-quantized prediction error information and the corrected non-standard predicted image to generate a non-standard decoded image. The procedure of generating a decoded image in the non-standard decoding unit 50b may include, for example, a process for improving image quality such as arbitrarily inserting a quantization noise reducing filter, as opposed to the decoding procedure specified in the standard.

Next, the operation of the decoding apparatus according to the present embodiment will be described. In the encoder (not shown), moving-image compression coding using motion-compensated inter-frame prediction is performed on an input video signal to be transmitted. That is, the encoder constructs a reference image according to a widely known procedure and compares this and an image being coded to obtain a motion vector. Then, the image obtained by displacing the subject in the reference image by the length of the motion vector is generated as a predicted image, and the prediction error information indicating the difference for each pixel between the image being coded and the predicted image is generated. The encoder quantizes the obtained prediction error information and performs entropy coding such as variable length coding on this. The encoder multiplexes this prediction error information with the coding mode information, prediction mode information, motion vector information, and quantization parameter information that are related to the coding process, and transmits the multiplexed information as video compression coded data to the decoding apparatus.

The video compression coded data transmitted from the encoder is received by the entropy decoding unit 10 of the decoding apparatus. The entropy decoding unit 10 separates the coding mode information, prediction mode information, motion vector information, prediction error information, and quantization parameter information that are contained in the received video compression coded data and multiplexed. The entropy decoding unit 10 supplies the prediction mode information and motion vector information to the non-standard predicted image generating unit 20, supplies the prediction mode information, motion vector information, prediction error information, and quantization parameter information to the standard predicted image generating unit 30, supplies the quantization parameter information to the correction value calculating unit 40, and supplies the prediction error information and quantization parameter information to the non-standard decoded image generating unit 50.

The non-standard predicted image generating unit 20 stores a non-standard decoded image of image quality different from standard quality supplied from the non-standard decoded image generating unit 50 in the frame memory 20a. The prediction processing unit 20b references the non-standard decoded image stored in the frame memory 20a and generates a non-standard predicted image from this image, the motion vector information, and the prediction mode information. The generated non-standard predicted image is supplied to the correction value calculating unit 40 and the non-standard decoded image generating unit 50. Because the prediction processing unit 20b uses as a reference image the non-standard decoded image, degradation in whose image quality can be expected to be reduced as compared with a decoded image generated according to the standard procedure, the generated non-standard predicted image can be expected to be a good image with the influence of degradation in its image quality due to quantization noise being reduced. Note that after performing a process such as inter-pixel interpolation using an interpolation filter having arbitrary filter coefficients on the reference image, the non-standard predicted image generating unit 20 may generate a predicted image. The non-standard predicted image generated in this way is different in image quality from a standard predicted image generated according to the standard and can be expected to be better in image quality than the standard predicted image. However, depending on the case, the deviations from the standard predicted image may be large, and if a decoded image is constructed based on this non-standard predicted image, degradation in image quality may occur.

In order to detect such a case and prevent degradation in image quality, in the standard predicted image generating unit 30, a standard predicted image according to the standard is generated; in the correction value calculating unit 40, correction values are generated based on the differences (deviations) between the non-standard predicted image and the standard predicted image; and in the non-standard decoded image generating unit 50, correction based on the correction values is performed on the non-standard predicted image to construct a non-standard decoded image, in generating a decoded image using the non-standard predicted image.

The standard decoding unit 30a of the standard predicted image generating unit 30 generates a standard decoded image according to the standard such as H.264 or MPEG-2 based on the prediction error information and the quantization parameter information and temporarily stores this image in the frame memory 30b. The prediction processing unit 30c references the standard decoded image stored in the frame memory and generates a standard predicted image from this image, the motion vector information, and the prediction mode information. The standard predicted image generating unit 30 supplies the generated standard predicted image to the correction value calculating unit 40.

The correction value calculating unit 40 performs the following process to evaluate whether the non-standard predicted image supplied from the non-standard predicted image generating unit 20 is appropriate. The correction value calculating unit 40 compares the pixel values of the non-standard predicted image and those of the standard predicted image and calculates the difference (deviation) for each pixel. Then, it is evaluated whether the deviation for each pixel between both the images is within the range of quantization errors occurring when coding. The range of quantization errors is identified by referencing quantization step size contained in the quantization parameter information. When having determined that the deviations between both the images are within the range of quantization errors occurring in video compression coded data, the correction value calculating unit 40 does not output correction values. That is, in this case, the non-standard decoded image generating unit 50 does not perform correction on the non-standard predicted image in generating the non-standard decoded image. On the other hand, when having determined that deviations between both the images are at or above the quantization error, the correction value calculating unit 40 outputs correction values to correct pixel values of the non-standard predicted image such that the deviations between both the images become, e.g., zero. The method of calculating correction values may be, for example, to obtain correction values to correct the pixel values of the non-standard predicted image such that the deviations between both the images become the upper or lower limit of the range of quantization errors, other than to obtain such correction values as to make the deviations between both the images be zero. Or, correction values may be obtained to correct the pixel values of the non-standard predicted image such that the deviations between both the images become a value inward by a predetermined value from the upper or lower limit of the range of quantization errors. Or, correction values may be adaptively obtained from a relationship with neighboring pixels. The correction value calculating unit 40 supplies the correction values generated to the non-standard decoded image generating unit 50.

The predicted image reconstructing unit 50a of the non-standard decoded image generating unit 50 corrects the non-standard predicted image based on the correction values supplied from the correction value calculating unit 40. By this correction, the non-standard predicted image is reconstructed such that the deviations from the standard predicted image are within the range of quantization errors. The non-standard decoding unit 50b inverse-quantizes the prediction error information quantized by the encoder based on the quantization parameter information to reproduce prediction errors and adds the prediction errors and the corrected non-standard predicted image to generate a decoded image, which is output as a non-standard decoded image. In constructing a decoded image, decoding is performed by a procedure different from the standard decoding procedure, including, e.g., arbitrarily inserting a quantization noise reducing filter for reducing quantization errors, or so on to construct a decoded image with degradation in its image quality due to quantization errors being reduced. The generated non-standard decoded image, being output onto an output terminal, is supplied to the non-standard predicted image generating unit 20 to construct a predicted image for decoding the next unit to be processed.

As such, according to the apparatus for decoding video compression coded data according to the first embodiment of the present invention, in the non-standard decoded image generating unit 50, in order to reduce degradation in image quality due to quantization errors, a decoded image is constructed by a procedure different from the standard one, and further the non-standard decoded image whose image quality is expected to be improved by this decoding is referenced to generate a predicted image (non-standard predicted image). Hence, a visually better decoded image can be generated than by the standard method. Further, when generating a decoded image using a non-standard predicted image of image quality different from standard quality, depending on the case, degradation in image quality might be caused on the contrary, but remarkable degradation in image quality can be prevented because corrections are made such that the deviations from the standard predicted image are within the range of quantization errors.

Embodiment 2

Figure 2:
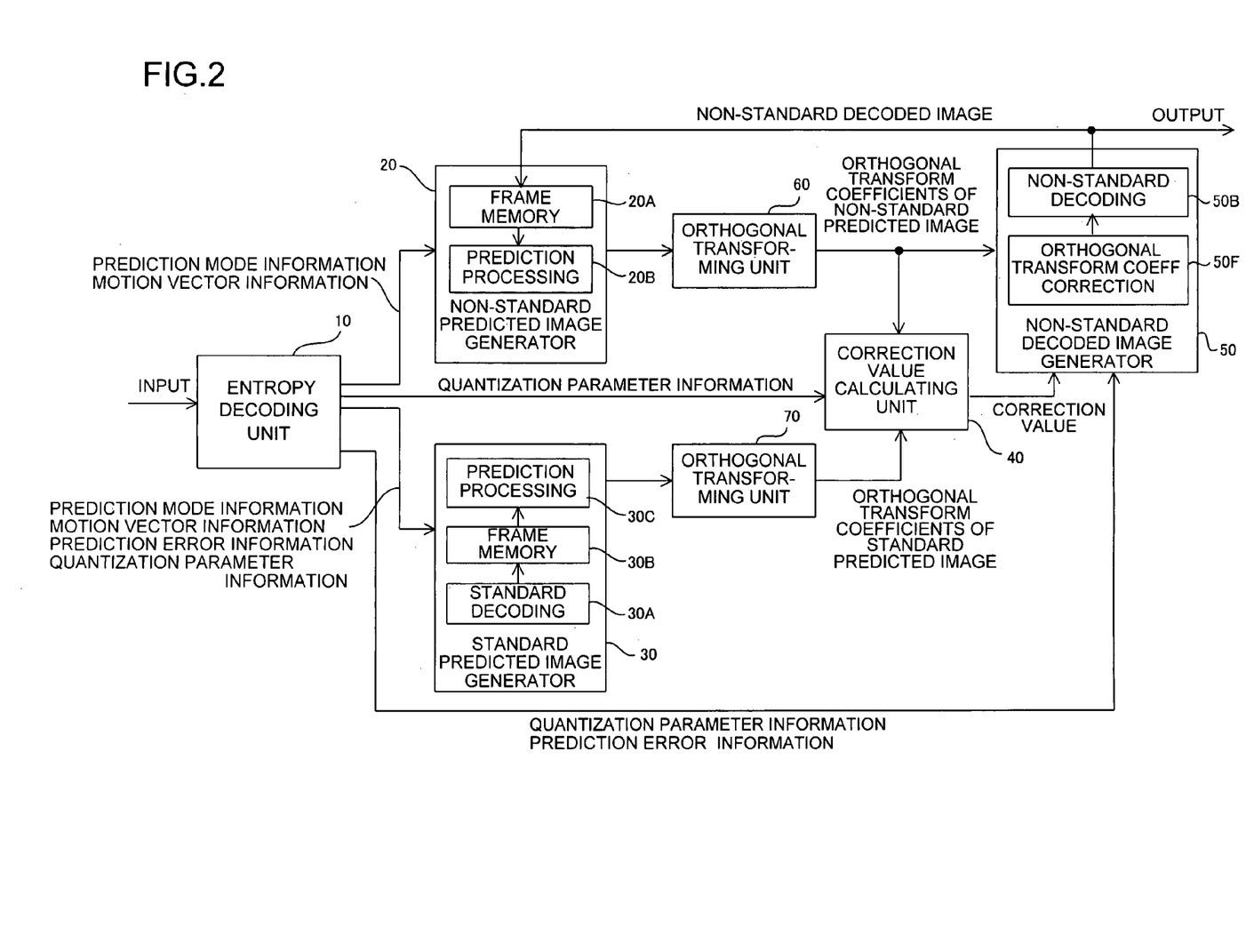
FIG. 2 is a block diagram showing the configuration of an apparatus for decoding video compression coded data according to a second embodiment of the present invention.

FIG. 2 is a block diagram showing the configuration of an apparatus for decoding video compression coded data that is a second embodiment of the present invention. The decoding apparatus according to the second embodiment is configured to decode coded data subjected to compression coding according to a so-called hybrid scheme of a combination of motion-compensated inter-frame prediction and an orthogonal transform such as a discrete cosine transform (DCT) in an encoder. Specifically, the second embodiment differs from the first embodiment in that orthogonal transforming units 60, 70 are provided respectively at the subsequent stages of the non-standard predicted image generating unit 20 and of the standard predicted image generating unit 30. The differences from the first embodiment will be described below.

A non-standard predicted image generated in the non-standard predicted image generating unit 20 is supplied to the orthogonal transforming unit 60. The orthogonal transforming unit 60 performs an orthogonal transform such as a discrete cosine transform (DCT) on the non-standard predicted image supplied to generate orthogonal transform coefficients for the non-standard predicted image and supplies them to the non-standard decoded image generating unit 50 and the correction value calculating unit 40. Likewise, the orthogonal transforming unit 70 performs the orthogonal transform on a standard predicted image generated in the standard predicted image generating unit 30 and supplies the orthogonal transform coefficients of the standard predicted image to the correction value calculating unit 40.

The correction value calculating unit 40 identifies the deviations between the non-standard predicted image and the standard predicted image in the domain of orthogonal transform coefficients, and calculates a correction value for each orthogonal transform coefficient component based on the quantization parameter information so as to correct the orthogonal transform coefficients of the non-standard predicted image such that the deviations in orthogonal transform coefficients between both the images are within the range of quantization errors, and supplies the correction values to the non-standard decoded image generating unit 50.

An orthogonal transform coefficient correcting unit 50f of the non-standard decoded image generating unit 50 corrects the orthogonal transform coefficients of the non-standard predicted image based on the orthogonal transform coefficients of the non-standard predicted image and the correction values supplied from the correction value calculating unit 40. By this correction, the non-standard predicted image expressed in the orthogonal transform coefficient domain is corrected such that the deviations from the standard predicted image are within the range of quantization errors. The non-standard decoding unit 50*b* inverse-quantizes the prediction error information orthogonal-transformed and quantized by the encoder based on the quantization parameter information to reproduce prediction error coefficients and adds the reproduced prediction error coefficients and the corrected orthogonal transform coefficients of the non-standard predicted image and then performs an inverse orthogonal transform thereon to generate a decoded image, which is output as a non-standard decoded image. In constructing a decoded image, the non-standard decoded image generating unit 50 performs decoding by a procedure different from the standard decoding procedure, including, e.g., arbitrarily inserting a quantization noise reducing filter for reducing quantization errors, or so on to construct a decoded image with degradation in its image quality due to quantization errors being reduced. The generated non-standard decoded image, being output onto an output terminal, is supplied to the non-standard predicted image generating unit 20 to construct a predicted image for decoding the next unit to be processed.

As such, according to the decoding apparatus according to the second embodiment, the same effect as in the first embodiment can be obtained, and in addition, when decoding coded data subjected to the orthogonal transform, the differences (deviations) between the standard predicted image and the non-standard predicted image can be identified not in the pixel domain but in the orthogonal transform coefficient domain where quantization noise actually occurs. Thus, the correction of the non-standard predicted image can be performed based on these deviations.

Embodiment 3

Figure 3:
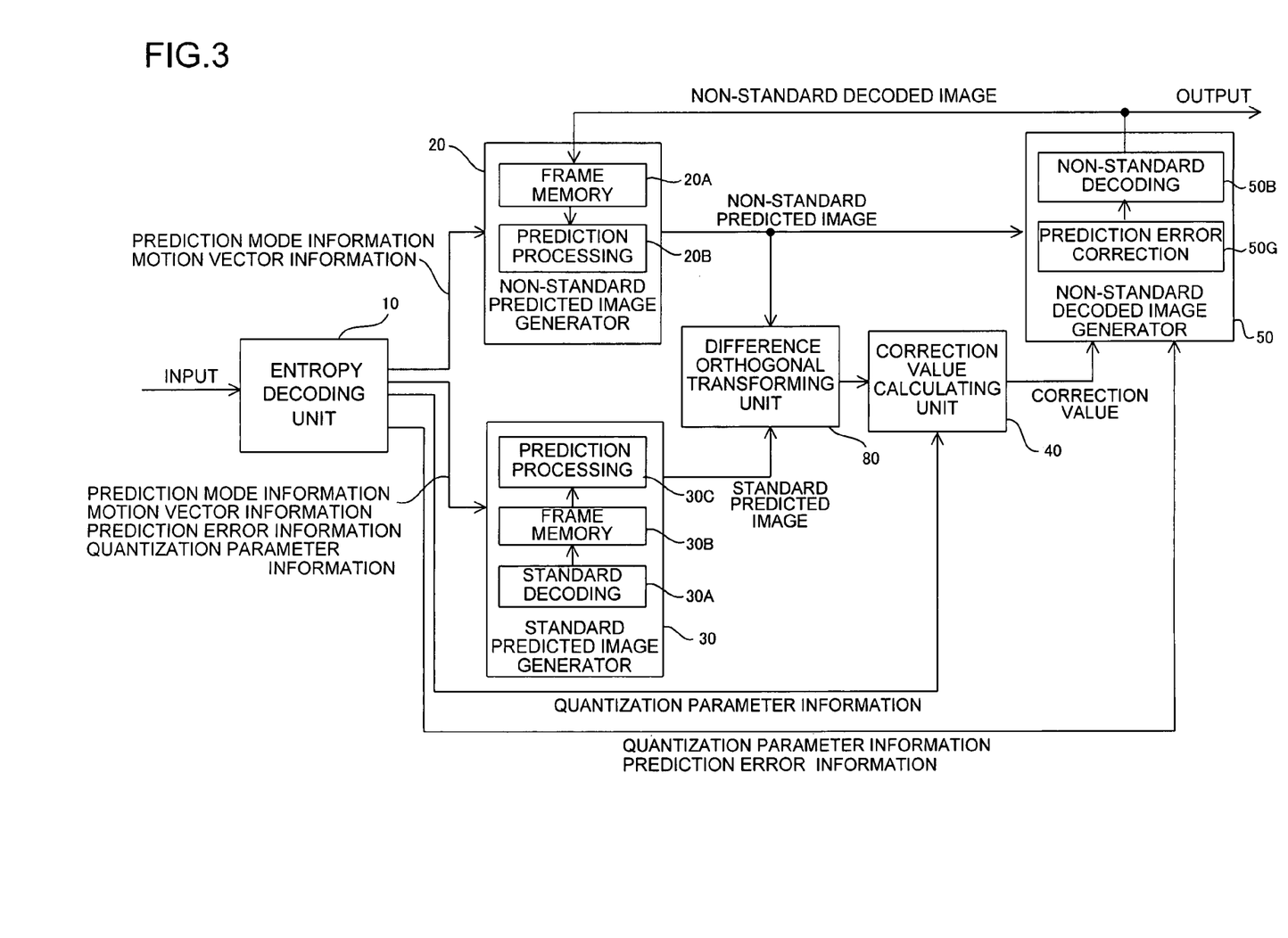
FIG. 3 is a block diagram showing the configuration of an apparatus for decoding video compression coded data according to a third embodiment of the present invention.

FIG. 3 is a block diagram showing the configuration of an apparatus for decoding video compression coded data that is a third embodiment of the present invention. The decoding apparatus according to the third embodiment is configured to decode coded data subjected to coding according to the hybrid scheme of a combination of motion-compensated inter-frame prediction and an orthogonal transform such as a discrete cosine transform (DCT) in an encoder, as in the second embodiment. While in the second embodiment the decoding apparatus identifies the differences (deviations) between both the images in the orthogonal transform coefficient domain after performing the orthogonal transform on each of the non-standard predicted image and the standard predicted image, the third embodiment differs from the second embodiment in that the differences (deviations) between the non-standard predicted image and the standard predicted image are identified in the pixel domain and that the orthogonal transform such as a discrete cosine transform (DCT) is performed on the differences.

Specifically, the non-standard predicted image generated in the non-standard predicted image generating unit 20 is supplied to a difference orthogonal transforming unit 80. The standard predicted image generated in the standard predicted image generating unit 30 is also supplied to the difference orthogonal transforming unit 80. The difference orthogonal transforming unit 80 identifies the differences between the non-standard predicted image and the standard predicted image in the pixel domain and performs the orthogonal transform on the identified differences between both the images and supplies the obtained orthogonal transform coefficients for the differences to the correction value calculating unit 40.

The correction value calculating unit 40 calculates a correction value for each orthogonal transform coefficient component based on the quantization parameter information so as to correct the orthogonal transform coefficients of the non-standard predicted image such that the deviations, expressed in orthogonal transform coefficients, between the non-standard predicted image and the standard predicted image are within the range of quantization errors, and supplies the correction values to the non-standard decoded image generating unit 50.

A prediction error correcting unit 50*g* of the non-standard decoded image generating unit 50 inverse-quantizes the prediction error information orthogonal-transformed and quantized by the encoder based on the quantization parameter information to reproduce prediction error coefficients and adds the correction values supplied from the correction value calculating unit 40 to them and then performs an inverse orthogonal transform thereon to generate corrected prediction errors that are prediction errors from the non-standard predicted image. The corrected prediction errors obtained by this correction are prediction errors from the non-standard predicted image that contain correction values to correct such that the deviations between the non-standard predicted image and the standard predicted image are within the range of quantization errors. The non-standard decoding unit 50*b* adds the corrected prediction errors and the non-standard predicted image and then generates a decoded image and outputs this as a non-standard decoded image. In constructing a decoded image, the non-standard decoded image generating unit 50 performs decoding by a procedure different from the standard decoding procedure, including, e.g., arbitrarily inserting a quantization noise reducing filter for reducing quantization errors, or so on to construct a decoded image with degradation in its image quality due to quantization errors being reduced. The generated non-standard decoded image, being output onto an output terminal, is supplied to the non-standard predicted image generating unit 20 to construct a predicted image for decoding the next unit to be processed.

As such, according to the decoding apparatus according to the third embodiment, the same effect as with those of the first and second embodiments can be obtained, and in addition, without the need to perform the orthogonal transform on each of the non-standard predicted image and the standard predicted image, the number of orthogonal transforms can be reduced as compared with the second embodiment.

Embodiment 4

Figure 4:
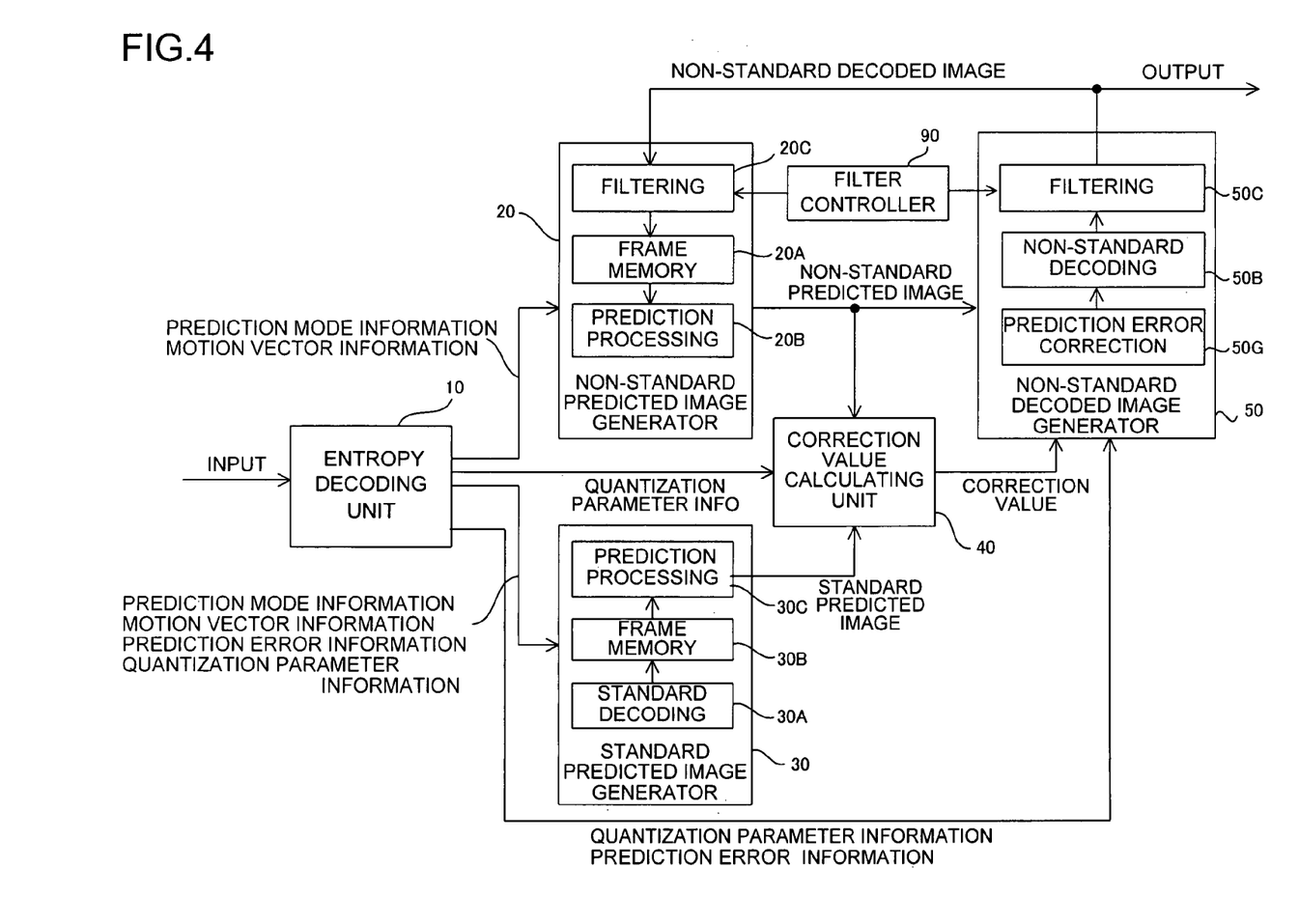
FIG. 4 is a block diagram showing the configuration of an apparatus for decoding video compression coded data according to a fourth embodiment of the present invention.

FIG. 4 is a block diagram showing the configuration of an apparatus for decoding video compression coded data that is a fourth embodiment of the present invention. In the decoding apparatus according to the fourth embodiment, the non-standard predicted image generating unit 20 and the non-standard decoded image generating unit 50 have a first filtering unit 50*c* and a second filtering unit 20*c* respectively, and a filter control unit 90 is provided to control these filtering units 20*c*, 50*c*. The description below will be made taking as an example the case where the decoding apparatus according to the present embodiment is configured to have the decoding apparatus according to the first embodiment as the base, but not being limited to this, the apparatus can be configured to have the decoding apparatus according to the second or third embodiment as the base.

A non-standard decoded image generated by the non-standard decoded image generating unit 50 is supplied as a reference image for generating a predicted image to the non-standard predicted image generating unit 20. The second filtering unit 20c performs filtering on the non-standard decoded image supplied. The second filtering unit 20c is controlled by the filter control unit 90 to apply/not apply filtering and, when the filter control unit 90 issues a control signal indicating "application of filtering", performs such filtering on the received non-standard decoded image as to improve its image quality for use as a reference image, for example, by reducing block distortion. In the second filtering unit 20c, an image quality improving process such as edge enhancement as well as noise reduction may be performed. The second filtering unit 20c may be constituted by a plurality of stages of filters different in the process content and may perform a variety of filtering on a decoded image. The filtered non-standard decoded image is stored in the frame memory 20a. On the other hand, when the filter control unit 90 issues a control signal indicating "non-application of filtering", the second filtering unit 20c does not perform filtering on the received non-standard decoded image and stores it, as it is, in the frame memory 20a. The prediction processing unit 20b references the non-standard decoded image stored in the frame memory 20a and generates a non-standard predicted image from this image, the motion vector information, and the prediction mode information. The generated non-standard predicted image is supplied to the correction value calculating unit 40 and the non-standard decoded image generating unit 50. The non-standard predicted image generated in this way is different in image quality from a standard predicted image generated according to the standard and can be expected to be better in image quality than the standard predicted image. However, depending on the case, the deviations from the standard predicted image may be large, and if a decoded image is constructed based on this non-standard predicted image, degradation in image quality may occur.

In order to detect such a case and prevent degradation in image quality, in the standard predicted image generating unit 30, a standard predicted image according to the standard is generated; in the correction value calculating unit 40, correction values are generated based on the differences (deviations) between the non-standard predicted image and the standard predicted image; and in the non-standard decoded image generating unit 50, correction based on the correction values is performed on the non-standard predicted image to construct a non-standard decoded image, in generating a decoded image using the non-standard predicted image.

The standard decoding unit 30a of the standard predicted image generating unit 30 generates a standard decoded image according to the standard such as H.264 or MPEG-2 based on the prediction error information and the quantization parameter information and temporarily stores this image in the frame memory 30b. The prediction processing unit 30c references the standard decoded image stored in the frame memory 30b and generates a standard predicted image from this image, the motion vector information, and the prediction mode information. The standard predicted image generating unit 30 supplies the generated standard predicted image to the correction value calculating unit 40.

The correction value calculating unit 40 references the quantization parameters and calculates correction values to correct the pixel values of the non-standard predicted image such that the differences (deviations) between the non-standard predicted image and the standard predicted image are within the range of quantization errors occurring when coding and supplies them to the non-standard decoded image generating unit 50.

The predicted image reconstructing unit 50a of the non-standard decoded image generating unit 50 corrects the non-standard predicted image based on the correction values supplied from the correction value calculating unit 40. By this correction, the non-standard predicted image is reconstructed such that the deviations from the standard predicted image are within the range of quantization errors. The non-standard decoding unit 50b inverse-quantizes the prediction error information quantized by the encoder based on the quantization parameter information to reproduce prediction errors and adds the reproduced prediction errors and the corrected non-standard predicted image to generate a decoded image. The decoded image generated is supplied to the first filtering unit 50c. The first filtering unit 50c is controlled by the filter control unit 90 to apply/not apply filtering and, when the filter control unit 90 issues a control signal indicating "application of filtering", performs noise reduction such as quantization noise reduction on the decoded image. In the first filtering unit 50c, an image quality improving process such as edge enhancement as well as noise reduction may be performed. The first filtering unit 50c may be constituted by a plurality of stages of filters different in the process content and may perform a variety of filtering on a decoded image. The non-standard decoded image generating unit 50, outputting the filtered decoded image as a non-standard decoded image; supplies it to the non-standard predicted image generating unit 20 to construct a predicted image for decoding the next unit to be processed. When the filter control unit 90 issues a control signal indicating "non-application of filtering", the first filtering unit 50c does not perform filtering on the decoded image and outputs the decoded image generated as it is.

The filter control unit 90 supplies a control signal indicating application/non-application of filtering to the filtering units 20c, 50c provided in the non-standard predicted image generating unit 20 and the non-standard decoded image generating unit 50. For example, the filter control unit 90 applies both of the filters or only one of them depending on an external input. Or, the filter control unit 90 adaptively controls application/non-application of the filtering units 20c, 50c according to the noise level or the like of the decoded image.

As such, according to the decoding apparatus according to the fourth embodiment, good decoded images can be generated through the noise reduction process of the filtering units respectively provided in the non-standard decoded image generating unit 50 and the non-standard predicted image generating unit. Further, because application/non-application of the filtering can be controlled depending on an external input or the noise level or the like of decoded images, the image quality of output images can be set arbitrarily. Further, when generating a decoded image using a non-standard predicted image of image quality different from standard quality, depending on the case, degradation in image quality might be caused on the contrary, but remarkable degradation in image quality can be prevented because corrections are made such that the deviations from the standard predicted image are within the range of quantization errors.

Embodiment 5

Figure 5:
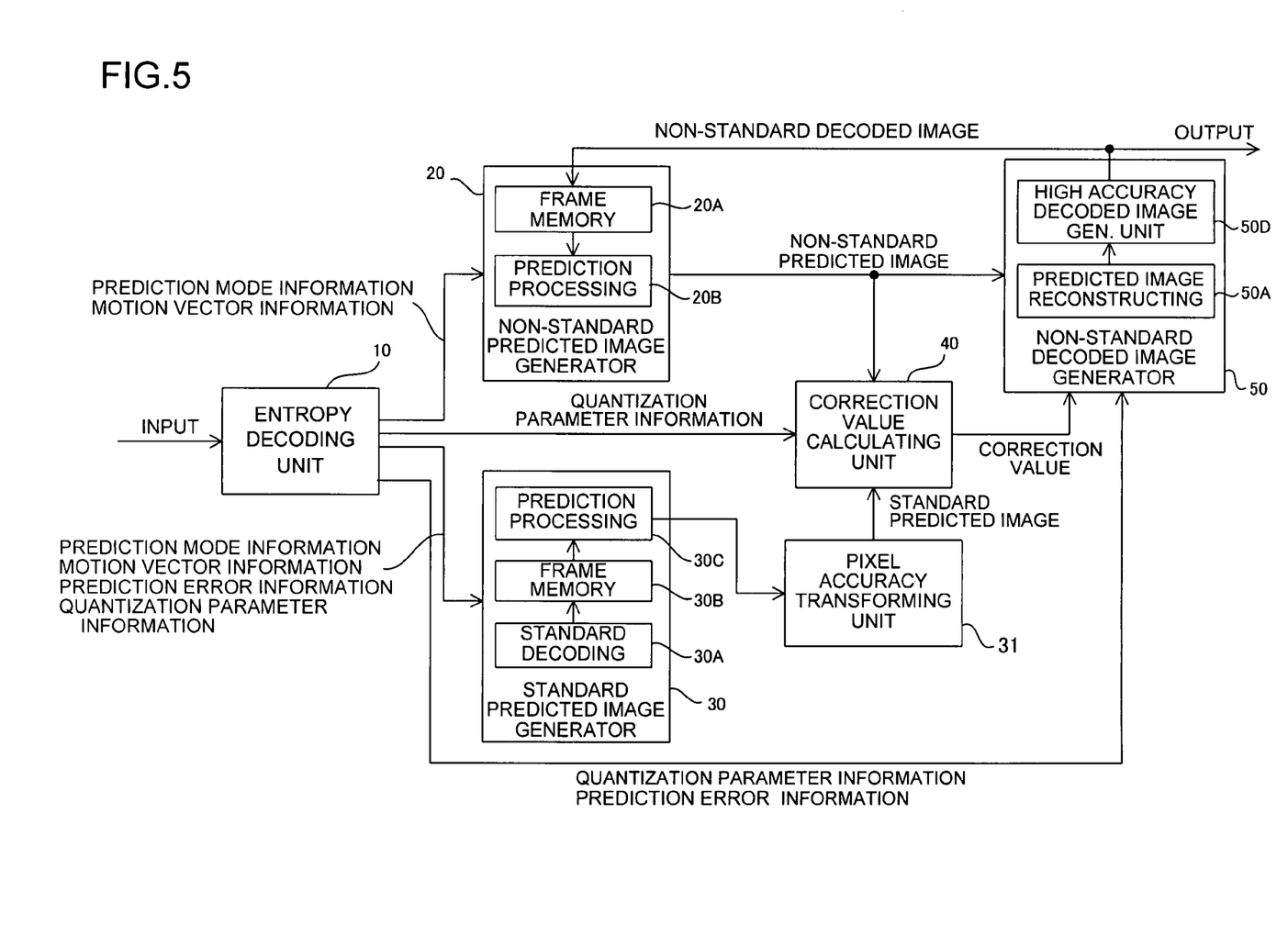
FIG. 5 is a block diagram showing the configuration of an apparatus for decoding video compression coded data according to a fifth embodiment of the present invention.

FIG. 5 is a block diagram showing the configuration of an apparatus for decoding video compression coded data that is a fifth embodiment of the present invention.

In decoded images generated conventionally according to the standard, each pixel is often expressed in 8 bits and outputted. Further, in H.264 or the like, the pixel accuracy (number of bits) of decoded images is specified in a video compression coded stream, and decoded images having a pixel value in the specified number of bits are constructed. In the decoding apparatus according to the present embodiment, a high accuracy decoded image generating unit 50*d* of the non-standard decoded image generating unit 50 constructs decoded images of higher accuracy (a larger number of bits per pixel) than the standard pixel accuracy specified in the input stream, and there is provided a pixel accuracy transforming unit 31 for making the pixel accuracy of standard predicted images generated by the standard predicted image generating unit 30 match that of non-standard predicted images generated higher in accuracy than them. The description below will be made taking as an example the case where the decoding apparatus according to the present embodiment is configured to have the decoding apparatus according to the first embodiment as the base, but not being limited to this, the apparatus can be configured to have the decoding apparatus according to the second or third embodiment as the base.

Where prediction errors are orthogonal-transformed in an encoder and transmitted, or so on, prediction errors reproduced by inverse-quantizing them based on the quantization parameter information in a decoding apparatus are usually information of higher accuracy (a larger number of bits) than the pixel accuracy of decoded images generated by the decoding apparatus. According to the conventional standard decoding procedure, the reproduced prediction error information is transformed by data rounding to the standard pixel accuracy before added to a predicted image. In contrast, the high accuracy decoded image generating unit 50*d* according to the present embodiment performs a reproducing process on the supplied prediction error information without performing rounding to the standard pixel accuracy. The predicted image reconstructing unit 50*a* performs correction on the non-standard predicted image of higher accuracy than the standard supplied from the non-standard predicted image generating unit 20 based on the correction values supplied from the correction value calculating unit 40. The high accuracy decoded image generating unit 50*d* adds the reproduced prediction errors remaining higher in accuracy and the non-standard predicted image corrected based on the correction values to generate a decoded image, which is output as a non-standard decoded image. The non-standard decoded image generated in this way is higher in accuracy than a standard decoded image. The non-standard decoded image, being output onto an output terminal, is supplied to the non-standard predicted image generating unit 20 to construct a predicted image for decoding the next unit to be processed.

The non-standard predicted image generating unit 20 stores the non-standard decoded image of higher accuracy than the standard supplied from the non-standard decoded image generating unit 50, as it is, keeping the higher accuracy, in the frame memory 20*a*. The prediction processing unit 20*b* references the non-standard decoded image stored in the frame memory 20*a* and generates a non-standard predicted image from this image, the motion vector information, and the prediction mode information. The rounding may be performed on the generated non-standard predicted image, in which case the pixel accuracy of the reference image is maintained, e.g., by restricting the rounding target bit to a lower bit than the standard one. The non-standard predicted image is supplied to the non-standard decoded image generating unit 50 and the correction value calculating unit 40. The non-standard predicted image generated in this way is of higher accuracy (a larger number of bits per pixel) than the pixel accuracy of the standard predicted image. By constructing a decoded image using this non-standard predicted image, a decoded image of good image quality can be expected to be constructed. However, depending on the case, the deviations from the standard predicted image may be large, and if a decoded image is constructed based on this non-standard predicted image, degradation in image quality may occur.

In order to detect such a case and prevent degradation in image quality, in the standard predicted image generating unit 30, a standard predicted image according to the standard is generated; in the correction value calculating unit 40, correction values are generated based on the differences (deviations) between the non-standard predicted image and the standard predicted image; and in the non-standard decoded image generating unit 50, correction based on the correction values is performed on the non-standard predicted image to construct a non-standard decoded image, in generating a decoded image using the non-standard predicted image.

The standard decoding unit 30*a* of the standard predicted image generating unit 30 generates a standard decoded image according to the standard such as H.264 or MPEG-2 based on the prediction error information and the quantization parameter information and temporarily stores this image in the frame memory 30*b*. The prediction processing unit 30*c* references the standard decoded image stored in the frame memory 30*b* and generates a standard predicted image from this image, the motion vector information, and the prediction mode information. The standard predicted image generating unit 30 supplies the generated standard predicted image to the correction value calculating unit 40.

The pixel accuracy transforming unit 31 performs pixel accuracy transformation on the supplied standard predicted image to make the pixel accuracy of the standard predicted image match that of the non-standard predicted image. Specifically, a process such as appending redundant bits to each pixel data of the standard predicted image so that the numbers of bits per pixel of the standard predicted image and the non-standard predicted image are equal is performed. The standard predicted image transformed in accuracy is supplied to the correction value calculating unit 40. Other than the above, the method of pixel accuracy transformation by the pixel accuracy transforming unit 31 may be to expand the range of pixel values of the standard predicted image by linear transformation or nonlinear transformation, or to refer to a predetermined transformation table, thereby performing accuracy transformation.

The correction value calculating unit 40 references the quantization parameters and calculates correction values to correct the pixel values of the non-standard predicted image such that the deviations between the non-standard predicted image and the standard predicted image transformed in accuracy are within the range of quantization errors occurring when coding and supplies them to the non-standard decoded image generating unit 50. The supplied correction values are used in the non-standard decoded image generating unit 50 to correct the non-standard predicted image as described above.

As such, according to the decoding apparatus according to the fifth embodiment, because decoded images of higher accuracy than the standard are constructed, decoded images of image quality better than standard quality can be generated. Further, when generating a decoded image using a non-standard predicted image of image quality different from standard quality, depending on the case, degradation in image quality might be caused on the contrary, but remarkable degradation in image quality can be prevented because corrections are made such that the deviations from the standard predicted image are within the range of quantization errors.

Embodiment 6

Figure 6:
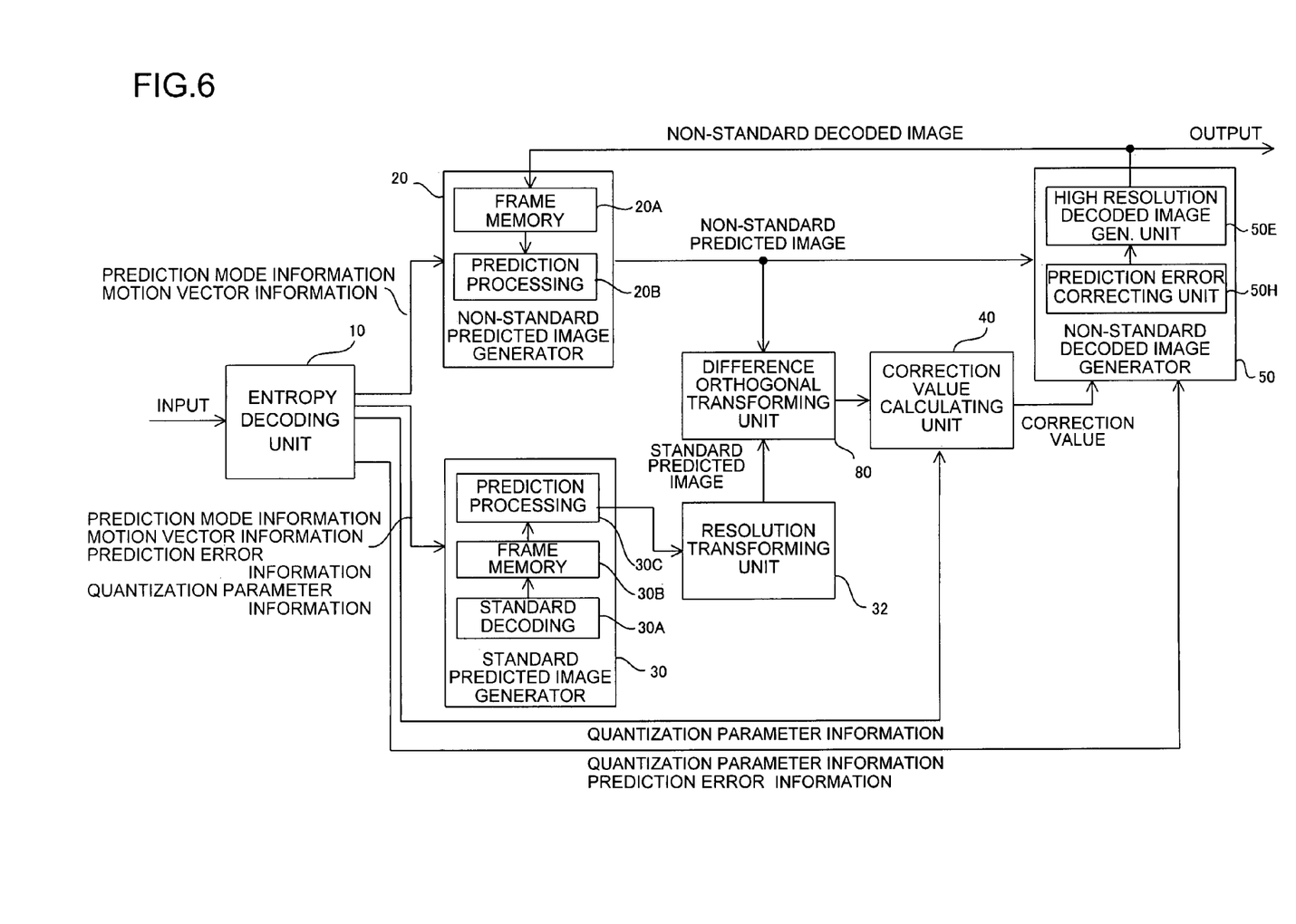
FIG. 6 is a block diagram showing the configuration of an apparatus for decoding video compression coded data according to a sixth embodiment of the present invention.

FIG. 6 is a block diagram showing the configuration of an apparatus for decoding video compression coded data according to a sixth embodiment of the present invention. In the decoding apparatus according to the sixth embodiment, a high resolution decoded image generating unit 50e of the non-standard decoded image generating unit 50 constructs decoded images of higher resolution than the resolution in which the input video compression coded data is expressed, and there is provided a resolution transforming unit 32 for making the resolution of standard predicted images generated by the standard predicted image generating unit 30 match that of non-standard predicted images generated higher in resolution than them. The description below will be made taking as an example the case of having the decoding apparatus according to the third embodiment as the base, but not being limited to this, the apparatus can be configured to have the decoding apparatus according to the first or second embodiment as the base.

The non-standard decoded image generating unit 50 generates a non-standard decoded image of higher resolution than a standard decoded image by the decoding of the high resolution decoded image generating unit 50e.

The non-standard predicted image generating unit 20 stores the non-standard decoded image of higher resolution than the standard supplied from the non-standard decoded image generating unit 50, as it is, keeping the resolution, in the frame memory 20a. The prediction processing unit 20b references the non-standard decoded image stored in the frame memory 20a and generates a non-standard predicted image from this image, the motion vector information, and the prediction mode information. At this time, coordinate system-related values of the reference image such as the motion vector are also scaled according to the resolution of the decoded image. The non-standard predicted image generated is supplied to a difference orthogonal transforming unit 80. The non-standard predicted image generated in this way is of higher resolution than the resolution of the standard predicted image. By constructing a decoded image using this non-standard predicted image, a decoded image of good image quality can be expected to be constructed. However, depending on the case, the deviations from the standard predicted image may be large, and if a decoded image is constructed based on this non-standard predicted image, degradation in image quality may occur.

In order to detect such a case and prevent degradation in image quality, in the standard predicted image generating unit 30, a standard predicted image according to the standard is generated; in the correction value calculating unit 40, correction values are generated based on the differences (deviations) between the non-standard predicted image and the standard predicted image; and in the non-standard decoded image generating unit 50, correction based on the correction values is performed.

The standard predicted image generating unit 30 generates a standard decoded image of standard resolution according to the standard such as H.264 or MPEG-2 based on the prediction error information and the quantization parameter information and generates a standard predicted image of standard resolution from this image, the motion vector information, and the prediction mode information. Image areas of the standard predicted image that are units in generation (e.g., macroblocks or unit image areas smaller than them) are smaller in the number of pixels than those of the non-standard predicted image. The generated standard predicted image is supplied to the resolution transforming unit 32.

The resolution transforming unit 32 performs resolution transformation on the supplied standard predicted image to make the resolution of the standard predicted image match that of the non-standard predicted image. Specifically, an up-sampling process or adaptive inter-pixel interpolation to retain edges and the property of texture as much as possible is performed so that the resolutions of the standard predicted image and the non-standard predicted image become equal. The standard predicted image transformed in resolution is supplied to the difference orthogonal transforming unit 80.

The difference orthogonal transforming unit 80 identifies, in the pixel domain, the differences between the non-standard predicted image and the standard predicted image transformed in resolution and performs orthogonal transform with a larger number of input/output points, according to higher resolution, than that of the standard on the identified differences between both the images and supplies obtained orthogonal transform coefficients to the correction value calculating unit 40.

The correction value calculating unit 40 calculates a correction value for each orthogonal transform coefficient component based on the quantization parameter information to correct the orthogonal transform coefficients of the non-standard predicted image such that the deviations between the non-standard predicted image and the standard predicted image, indicated by the orthogonal transform coefficients, are within the range of quantization errors and supplies them to the non-standard decoded image generating unit 50. At this time, for orthogonal transform coefficient points of differences having no corresponding transform coefficient point in orthogonal transform for the standard resolution, there are no correction values, or filtering to attenuate the gains for those differences may be applied. For example, in the case of transformation to the frequency domain like the DCT, for high frequency components having no corresponding transform coefficient point, there are no correction values, or correction values to attenuate those high frequency components may be output.

A prediction error correcting unit 50h of the non-standard decoded image generating unit 50 inverse-quantizes the prediction error information orthogonal-transformed and quantized by the encoder based on the quantization parameter information to reproduce prediction error coefficients and adds them and the correction values supplied from the correction value calculating unit 40 respectively for corresponding transform coefficients and then performs inverse orthogonal transform with a larger number of input/output points than that of the standard to generate prediction errors from the non-standard predicted image that are expressed in the pixel domain of higher resolution and that contain the correction values. The high resolution decoded image generating unit 50e adds the generated prediction errors containing the correction values and the non-standard predicted image, thereby generating a non-standard decoded image of higher resolution than the standard decoded image. The non-standard decoded image, being output onto an output terminal, is supplied to the non-standard predicted image generating unit 20 to construct a predicted image for decoding the next unit to be processed.

As such, according to the decoding apparatus according to the sixth embodiment, because decoded images of higher resolution than the standard are constructed, decoded images of image quality better than standard quality can be generated. Further, when generating a decoded image using a non-standard predicted image of image quality different from standard quality, depending on the case, degradation in image quality might be caused on the contrary, but remarkable degradation in image quality can be prevented because corrections are made such that the deviations from the standard predicted image are within the range of quantization errors.

Embodiment 7

Figure 7:
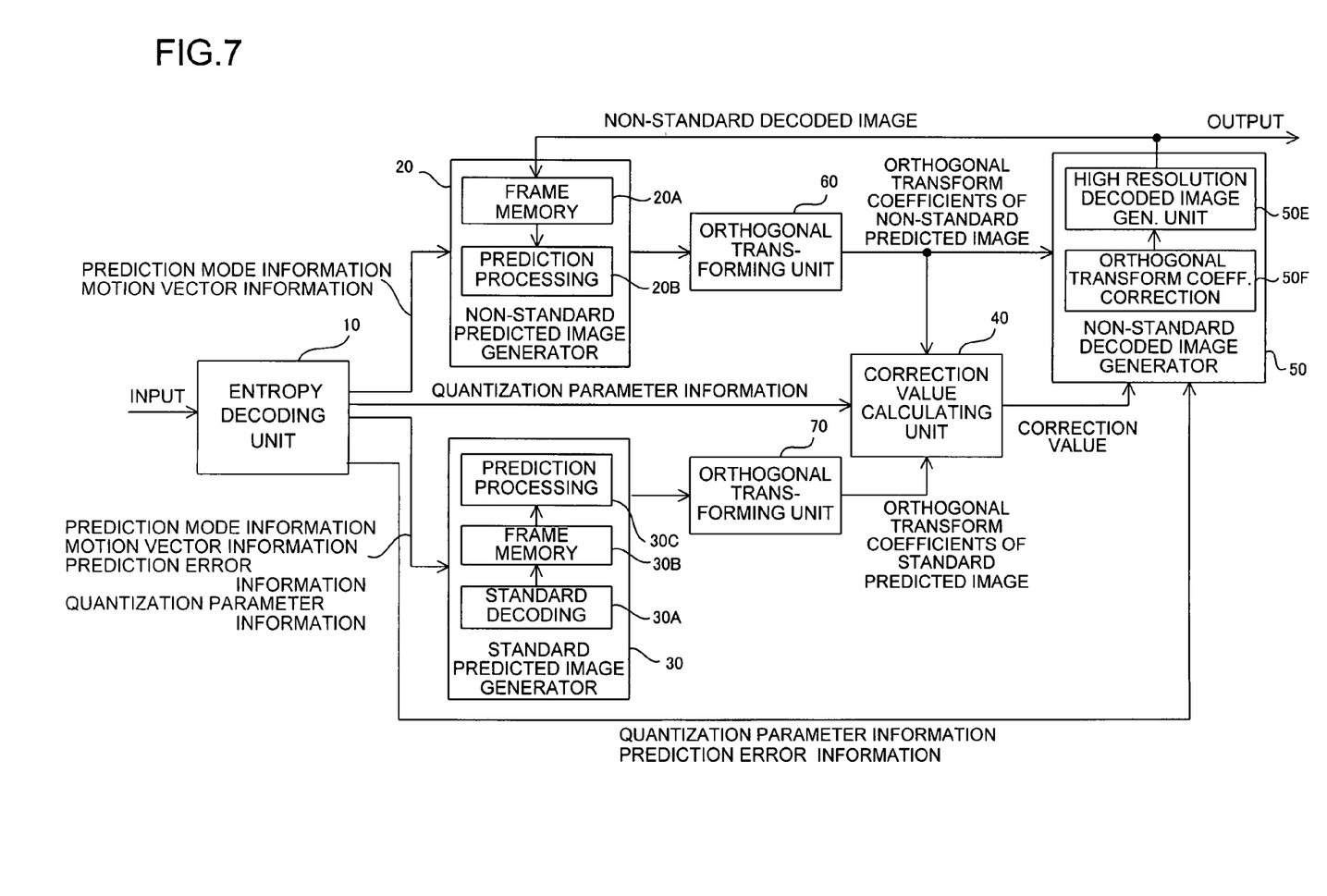
FIG. 7 is a block diagram showing the configuration of an apparatus for decoding video compression coded data according to a seventh embodiment of the present invention.

FIG. 7 is a block diagram showing the configuration of an apparatus for decoding video compression coded data according to a seventh embodiment of the present invention. In the decoding apparatus according to the seventh embodiment, the high resolution decoded image generating unit 50*e* of the non-standard decoded image generating unit 50 constructs decoded images of higher resolution than the resolution in which the input video compression coded data is expressed, as in the decoding apparatus according to the sixth embodiment. The decoding apparatus differs from that according to the sixth embodiment in that it identifies the differences between the non-standard predicted image and the standard predicted image not in the pixel domain but in the orthogonal transform coefficient domain to calculate correction values. The differences from the decoding apparatus according to the sixth embodiment will be described below.

A non-standard predicted image of higher resolution generated by the non-standard predicted image generating unit 20 is supplied to the orthogonal transforming unit 60. The orthogonal transforming unit 60 performs an orthogonal transform such as a discrete cosine transform (DCT) with a larger number of input/output points than that of the standard on the non-standard predicted image supplied to generate orthogonal transform coefficients of the non-standard predicted image and supplies them to the non-standard decoded image generating unit 50 and the correction value calculating unit 40. Likewise, the orthogonal transforming unit 70 performs the orthogonal transform on a standard predicted image generated in the standard predicted image generating unit 30 and supplies orthogonal transform coefficients for the standard predicted image to the correction value calculating unit 40. The non-standard predicted image is higher in resolution than the standard predicted image and is also greater in the number of pixels, and hence is greater in the number of transform points of orthogonal transform. Thus, orthogonal transform is performed such that both the images have transform coefficients that can be compared with each other between the two so that the correction value calculating unit 40 can identify the differences in orthogonal transform coefficients between both the images. For example, in the case of transformation to the frequency domain like the DCT, orthogonal transform is performed such that the lower frequency components of the transform coefficients of the non-standard predicted image can be compared with the transform coefficients of the standard predicted image.

The correction value calculating unit 40 identifies the differences (deviations) between the non-standard predicted image and the standard predicted image in the orthogonal transform coefficient domain. At this time, the orthogonal transform coefficients of the non-standard predicted image and those of the standard predicted image are different in the number of transform coefficient points, but the deviations between transform coefficients corresponding to each other are identified. For example, in the case where the orthogonal transform is transformation to the frequency domain like the DCT, the deviations between frequency components corresponding to each other between the two images are identified. The correction value calculating unit 40 calculates correction values based on the quantization parameter information to correct the orthogonal transform coefficients of the non-standard predicted image such that the identified deviations in orthogonal transform coefficients between both the images are within the range of quantization errors and supplies them to the non-standard decoded image generating unit 50. For orthogonal transform coefficient points of the non-standard predicted image having no corresponding transform coefficient point, their coefficients are used, as they are, without being corrected, that is, without correction values. Or, filtering to attenuate the gains for those deviations may be applied. For example, in the case of inverse transformation from the frequency domain like an inverse DCT, for high frequency components having no corresponding transform coefficient point, no correction is performed, or correction to attenuate the high frequency components may be performed.

The orthogonal transform coefficient correcting unit 50*f* of the non-standard decoded image generating unit 50 corrects the orthogonal transform coefficients of the non-standard predicted image based on the orthogonal transform coefficients of the non-standard predicted image and the correction values supplied from the correction value calculating unit 40. By this correction, the non-standard predicted image expressed in the orthogonal transform coefficient domain is corrected such that the deviations from the standard predicted image are within the range of quantization errors. The high resolution decoded image generating unit 50*e* inverse-quantizes the prediction error information orthogonal-transformed and quantized by an encoder based on the quantization parameter information to reproduce prediction error coefficients and adds the reproduced prediction error coefficients and the corrected orthogonal transform coefficients of the non-standard predicted image respectively for corresponding transform coefficients and then performs inverse orthogonal transform with a larger number of input/output transform points than that of the standard to generate a non-standard decoded image of higher resolution than a standard decoded image. The non-standard decoded image, being output onto an output terminal, is supplied to the non-standard predicted image generating unit 20 to construct a predicted image for decoding the next unit to be processed.

As such, according to the decoding apparatus according to the seventh embodiment, because decoded images of higher resolution than the standard are constructed, decoded images of image quality better than standard quality can be generated. Further, when generating a decoded image using a non-standard predicted image of image quality different from standard quality, depending on the case, degradation in image quality might be caused on the contrary, but remarkable degradation in image quality can be prevented because corrections are made such that the deviations from the standard predicted image are within the range of quantization errors. Further, when decoding coded data subjected to the orthogonal transform, the differences (deviations) between the standard predicted image and the non-standard predicted image can be identified not in the pixel domain but in the orthogonal transform coefficient domain where quantization noise actually occurs. Thus, the correction of the non-standard predicted image can be performed based on these deviations.

Various embodiments of the invention have been described, and other decoding apparatuses can also be configured by combining constituents shown in the embodiments as needed.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2009-090938, which is hereby incorporated by reference.

What is claimed is:

1. An apparatus for decoding video compression coded data into which prediction error information indicating differences between a predicted image generated from a decoded image and an image being coded was quantized and coded, comprising:
   a standard predicted image generating unit which generates a standard decoded image of standard image quality based on said prediction error information and generates a standard predicted image of standard image quality based on said standard decoded image;
   a non-standard decoded image generating unit which generates a non-standard decoded image different in image quality from said standard decoded image based on said prediction error information;
   a non-standard predicted image generating unit which generates a non-standard predicted image different in image quality from said standard predicted image based on said non-standard decoded image; and
   a correction value calculating unit which calculates correction values corresponding to differences between said standard predicted image and said non-standard predicted image,
   wherein said non-standard decoded image generating unit comprises a predicted image reconstructing unit which corrects said non-standard predicted image based on said correction values, and a non-standard decoding unit which inverse-quantizes said prediction error information for reproduction and which adds the inverse-quantized prediction error information and said corrected non-standard predicted image to generate said non-standard decoded image.

2. An apparatus for decoding video compression coded data into which prediction error information indicating differences between a predicted image generated from a decoded image and an image being coded was orthogonal-transformed and quantized, and coded, comprising:
   a standard predicted image generating unit which generates a standard decoded image of standard image quality based on said prediction error information and generates a standard predicted image of standard image quality based on said standard decoded image;
   a non-standard decoded image generating unit which generates a non-standard decoded image different in image quality from said standard decoded image based on said prediction error information;
   a non-standard predicted image generating unit which generates a non-standard predicted image different in image quality from said standard predicted image based on said non-standard decoded image;
   a first orthogonal transforming unit which orthogonal-transforms pixel values of said standard predicted image to generate orthogonal transform coefficients of said standard predicted image;
   a second orthogonal transforming unit which orthogonal-transforms pixel values of said non-standard predicted image to generate orthogonal transform coefficients of said non-standard predicted image; and
   a correction value calculating unit which calculates correction values corresponding to differences between the orthogonal transform coefficients of said standard predicted image and the orthogonal transform coefficients of said non-standard predicted image,
   wherein said non-standard decoded image generating unit comprises an orthogonal transform coefficient correcting unit which corrects the orthogonal transform coefficients of said non-standard predicted image based on said correction values, and a non-standard decoding unit which inverse-quantizes said prediction error information for reproduction and which adds the inverse-quantized prediction error information and the corrected orthogonal transform coefficients of said non-standard predicted image and then performs inverse orthogonal transform thereon to generate said non-standard decoded image.

3. An apparatus for decoding video compression coded data into which prediction error information indicating differences between a predicted image generated from a decoded image and an image being coded was orthogonal-transformed and quantized, and coded, comprising:
   a standard predicted image generating unit which generates a standard decoded image of standard image quality based on said prediction error information and generates a standard predicted image of standard image quality based on said standard decoded image;
   a non-standard decoded image generating unit which generates a non-standard decoded image different in image quality from said standard decoded image based on said prediction error information;
   a non-standard predicted image generating unit which generates a non-standard predicted image different in image quality from said standard predicted image based on said non-standard decoded image;
   a difference orthogonal transforming unit which orthogonal-transforms differences in pixel values between said standard predicted image and said non-standard predicted image into difference orthogonal transform coefficients; and
   a correction value calculating unit which calculates correction values corresponding to said difference orthogonal transform coefficients,
   wherein said non-standard decoded image generating unit comprises a prediction error correcting unit which inverse-quantizes said prediction error information for reproduction and which adds the inverse-quantized prediction error information and said correction values and then performs inverse orthogonal transform thereon to generate corrected prediction errors, which are prediction errors from said non-standard predicted image, and a non-standard decoding unit which adds said corrected prediction errors and said non-standard predicted image to generate said non-standard decoded image.

4. A decoding apparatus according to claim 1, wherein said correction value calculating unit calculates said correction values to correct pixel values of said non-standard decoded image such that differences between said standard predicted image and said non-standard predicted image are within the range of quantization errors occurring in said video compression coded data.

5. A decoding apparatus according to claim 2, wherein said correction value calculating unit calculates said correction values to correct the orthogonal transform coefficients of said non-standard decoded image such that differences between the orthogonal transform coefficients of said standard predicted image and the orthogonal transform coefficients of said non-standard predicted image are within the range of quantization errors occurring in said video compression coded data.

6. A decoding apparatus according to claim 3, wherein said correction value calculating unit calculates said correction values to correct the orthogonal transform coefficients of said non-standard decoded image such that differences between said standard predicted image and said non-standard predicted image are within the range of quantization errors occurring in said video compression coded data.

7. A decoding apparatus according to claim 1, wherein said non-standard decoded image generating unit comprises a first filtering unit which performs a noise reduction process on a generated decoded image, and said non-standard predicted image generating unit comprises a second filtering unit which performs a noise reduction process on said non-standard decoded image; a frame memory which temporarily stores said filtered non-standard decoded image; and a prediction processing unit which references said non-standard decoded image stored in said frame memory and which generates said non-standard predicted image from said non-standard decoded image and motion vector information, and wherein said decoding apparatus further comprises a filter control unit to control application/non-application of said first and second filtering units.

8. A decoding apparatus according to claim 1, wherein said decoding unit generates a decoded image higher in pixel accuracy than said standard decoded image and outputs this as said non-standard decoded image, and said non-standard predicted image generating unit generates said non-standard predicted image having the pixel accuracy of said non-standard decoded image maintained, and wherein said decoding apparatus further comprises a pixel accuracy transforming unit which transforms the pixel accuracy of said standard predicted image so as to match the pixel accuracy of said non-standard predicted image.

9. A decoding apparatus according to claim 1, wherein said decoding unit generates a decoded image of higher resolution than said standard decoded image and outputs this as said non-standard decoded image, and said non-standard predicted image generating unit generates said non-standard predicted image having the resolution of said non-standard decoded image maintained, and wherein said decoding apparatus further comprises a resolution transforming unit which transforms the resolution of said standard predicted image so as to match the resolution of said non-standard predicted image.

10. A decoding apparatus according to claim 2, wherein said decoding unit generates a decoded image of higher resolution than said standard decoded image and outputs this as said non-standard decoded image, and said non-standard predicted image generating unit generates said non-standard predicted image having the resolution of said non-standard decoded image maintained, and wherein said second orthogonal transforming unit generates orthogonal transform coefficients of a non-standard predicted image with a larger number of transform coefficient points than said first orthogonal transforming unit, and said correction value calculating unit calculates correction values corresponding to differences between the orthogonal transform coefficients of said standard predicted image and orthogonal transform coefficients of said non-standard predicted image for transform coefficient points corresponding to each other between the two images.

11. A decoding apparatus according to claim 2, wherein said non-standard decoded image generating unit comprises a first filtering unit which performs a noise reduction process on a generated decoded image, and said non-standard predicted image generating unit comprises a second filtering unit which performs a noise reduction process on said non-standard decoded image; a frame memory which temporarily stores said filtered non-standard decoded image; and a prediction processing unit which references said non-standard decoded image stored in said frame memory and which generates said non-standard predicted image from said non-standard decoded image and motion vector information, and wherein said decoding apparatus further comprises a filter control unit to control application/non-application of said first and second filtering units.

12. A decoding apparatus according to claim 2, wherein said decoding unit generates a decoded image higher in pixel accuracy than said standard decoded image and outputs this as said non-standard decoded image, and said non-standard predicted image generating unit generates said non-standard predicted image having the pixel accuracy of said non-standard decoded image maintained, and wherein said decoding apparatus further comprises a pixel accuracy transforming unit which transforms the pixel accuracy of said standard predicted image so as to match the pixel accuracy of said non-standard predicted image.

13. A decoding apparatus according to claim 2, wherein said decoding unit generates a decoded image of higher resolution than said standard decoded image and outputs this as said non-standard decoded image, and said non-standard predicted image generating unit generates said non-standard predicted image having the resolution of said non-standard decoded image maintained, and wherein said decoding apparatus further comprises a resolution transforming unit which transforms the resolution of said standard predicted image so as to match the resolution of said non-standard predicted image.

14. A decoding apparatus according to claim 3, wherein said non-standard decoded image generating unit comprises a first filtering unit which performs a noise reduction process on a generated decoded image, and said non-standard predicted image generating unit comprises a second filtering unit which performs a noise reduction process on said non-standard decoded image; a frame memory which temporarily stores said filtered non-standard decoded image; and a prediction processing unit which references said non-standard decoded image stored in said frame memory and which generates said non-standard predicted image from said non-standard decoded image and motion vector information, and wherein said decoding apparatus further comprises a filter control unit to control application/non-application of said first and second filtering units.

15. A decoding apparatus according to claim 3, wherein said decoding unit generates a decoded image higher in pixel accuracy than said standard decoded image and outputs this as said non-standard decoded image, and said non-standard predicted image generating unit generates said non-standard predicted image having the pixel accuracy of said non-standard decoded image maintained, and wherein said decoding apparatus further comprises a pixel accuracy transforming unit which transforms the pixel accuracy of said standard predicted image so as to match the pixel accuracy of said non-standard predicted image.

16. A decoding apparatus according to claim 3, wherein said decoding unit generates a decoded image of higher resolution than said standard decoded image and outputs this as said non-standard decoded image, and said non-standard predicted image generating unit generates said non-standard predicted image having the resolution of said non-standard decoded image maintained, and wherein said decoding apparatus further comprises a resolution transforming unit which transforms the resolution of said standard predicted image so as to match the resolution of said non-standard predicted image.

* * * * *